J. McCURDY.
Axles for Vehicles.

No. 158,855.  Patented Jan. 19, 1875.

UNITED STATES PATENT OFFICE.

JOHN McCURDY, OF SMICKSBURG, PENNSYLVANIA.

IMPROVEMENT IN AXLES FOR VEHICLES.

Specification forming part of Letters Patent No. 158,855, dated January 19, 1875; application filed March 19, 1874.

*To all whom it may concern:*

Be it known that I, JOHN McCURDY, of Smicksburg, county of Indiana and State of Pennsylvania, have invented certain new and useful Improvements in Axles for Buggies and other light Vehicles, of which the following is a specification:

My invention relates particularly to axles for buggies and other light vehicles, though it may be used on vehicles of any kind; and the nature of my invention consists in constructing the spindles and axle-tree separate, and uniting them by means of a screw formed on the inner end of each spindle and screwing into the end of the axle-tree, the hub-band being formed on the spindle, all as hereinafter more fully set forth.

In order to enable others skilled in the art to which my invention appertains to make and use the same, I will now proceed to describe its construction and operation, referring to the annexed drawing, in which—

Figure 1:
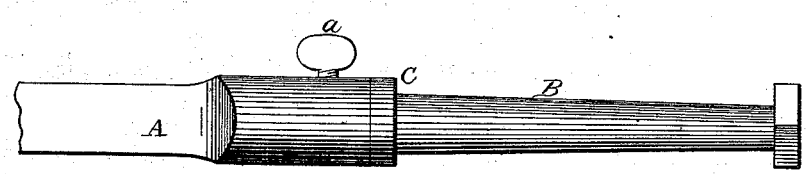
Figure 2:
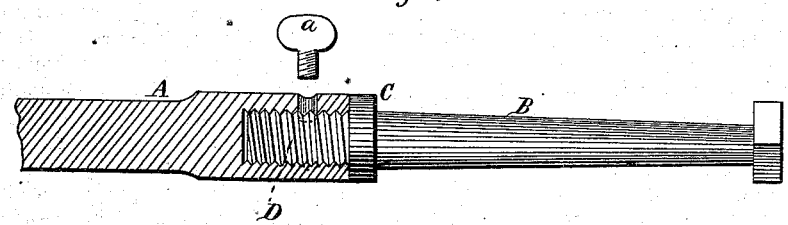

Figure 1 is a side view, and Fig. 2 a longitudinal section, of my invention.

A represents a part of the axle, and B is the spindle, constructed in any of the known and usual forms. Upon the spindle B, at the inner end is formed the hub-band C, and from this end of the spindle projects a screw, D, of suitable dimensions; or, the spindle may extend beyond the hub-band C, and have screw-threads formed on it. In the end of the axle-tree A is formed a core with female screw-threads, for the reception of the screw D of the spindle. The spindle is screwed into the end of the axle-tree firm and tight, after which a set-screw, $a$, is passed through the top of the axle-tree against and into the screw D, thereby holding the spindle and preventing it from unscrewing.

By this construction, in case of any injury to either spindle it can be easily removed, and another inserted in its place without disturbing the axle-tree or other parts of the vehicle.

Having thus fully described my invention, what I claim as new, and desire to secure by Letters Patent, is—

The combination of the spindle B, provided with the hub-band C and screw D, the axle-tree A, with threaded core in its end, and the set-screw $a$, all substantially as and for the purposes set forth.

In testimony that I claim the foregoing as my invention, I hereunto affix my signature this 14th day of March, 1874.

JOHN McCURDY.

Witnesses:
T. R. LUCKART,
WILLIAM H. PAUL.